United States Patent
Adams et al.

(10) Patent No.: US 9,944,287 B2
(45) Date of Patent: Apr. 17, 2018

(54) METHOD FOR CONTROLLING A HYDRODYNAMIC RETARDED THAT CAN BE DISENGAGED BY A DISCONNECT CLUTCH

(71) Applicant: Voith Patent GmbH, Heidenheim (DE)

(72) Inventors: Werner Adams, Crailsheim (DE); Dieter Laukemann, Crailsheim (DE); Achim Menne, Crailsheim (DE); Ravi Schade, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 226 days.

(21) Appl. No.: 14/960,821

(22) Filed: Dec. 7, 2015

(65) Prior Publication Data

US 2016/0082968 A1 Mar. 24, 2016

Related U.S. Application Data

(63) Continuation of application No. PCT/EP2014/057583, filed on Apr. 15, 2014.

(30) Foreign Application Priority Data

Jun. 7, 2013 (DE) .................. 10 2013 009 535

(51) Int. Cl.
  *B60W 30/18* (2012.01)
  *F16D 57/02* (2006.01)
  (Continued)

(52) U.S. Cl.
  CPC ......... *B60W 30/18109* (2013.01); *B60T 7/18* (2013.01); *B60T 10/02* (2013.01);
  (Continued)

(58) Field of Classification Search
  CPC ...... F16D 57/04; F16D 67/02; B60W 10/196; B60W 30/18109; B60W 2710/182; B60W 2710/021; F16H 41/24
  See application file for complete search history.

(56) References Cited

U.S. PATENT DOCUMENTS

| | | | |
|---|---|---|---|
| 8,939,870 B2 | 1/2015 | Wurthner et al. | |
| 2008/0159880 A1 * | 7/2008 | Laukemann | B60T 10/02 417/307 |

(Continued)

FOREIGN PATENT DOCUMENTS

| | | | |
|---|---|---|---|
| DE | 10 2007 024 698 A1 | 11/2008 | |
| WO | WO 2008145315 A1 * | 12/2008 | B60T 10/02 |
| WO | 2013/083422 A1 | 6/2013 | |

OTHER PUBLICATIONS

Communication Regarding the Transmission of the International Search Report and the Written Opinion of the International Searching Authority or Declaration dated May 26, 2015 for International Application No. PCT/EP2014/057583 (10 pages).

Primary Examiner — Ramya P Burgess
Assistant Examiner — Lillian T Nguyen
(74) Attorney, Agent, or Firm — Taylor IP, P.C.

(57) ABSTRACT

A method for controlling a hydrodynamic retarder in a motor vehicle that can be mechanically disengaged via a disconnect clutch, comprising a drive motor whose power output is controlled via an actuator such as a foot pedal or a lever; whereby in an overrun operation the acceleration of the motor vehicle is collected or detected and compared with a pre-specified acceleration value; and whereby in the non-braking mode the disconnect clutch is engaged, regardless of an initiation of a braking mode by an operator of the motor vehicle or a driver assist system and the working chamber is maintained drained when the acceleration exceeds an acceleration limit.

20 Claims, 1 Drawing Sheet

(51) Int. Cl.
*B60W 10/196* (2012.01)
*B60T 10/02* (2006.01)
*F16D 57/04* (2006.01)
*F16D 67/00* (2006.01)
*B60T 7/18* (2006.01)
*F16D 67/02* (2006.01)
*B60W 10/02* (2006.01)

(52) U.S. Cl.
CPC .......... *B60W 10/02* (2013.01); *B60W 10/196* (2013.01); *F16D 57/02* (2013.01); *F16D 57/04* (2013.01); *F16D 67/00* (2013.01); *F16D 67/02* (2013.01); *B60W 2540/12* (2013.01); *B60W 2560/00* (2013.01); *B60W 2710/021* (2013.01); *B60W 2710/182* (2013.01)

(56) References Cited

U.S. PATENT DOCUMENTS

| | | | |
|---|---|---|---|
| 2011/0194948 A1 | 8/2011 | Kley et al. | |
| 2012/0220422 A1 | 8/2012 | Wurthner et al. | |
| 2014/0151176 A1* | 6/2014 | Menne | B60T 10/02 192/3.24 |
| 2014/0182983 A1* | 7/2014 | Menne | B60T 10/02 188/291 |
| 2014/0330495 A1* | 11/2014 | Menne | B60T 10/02 701/68 |
| 2015/0184733 A1* | 7/2015 | Menne | F16H 47/06 192/3.34 |
| 2016/0084332 A1* | 3/2016 | Adams | F16D 67/02 188/291 |

\* cited by examiner

METHOD FOR CONTROLLING A HYDRODYNAMIC RETARDED THAT CAN BE DISENGAGED BY A DISCONNECT CLUTCH

CROSS REFERENCE TO RELATED APPLICATIONS

This is a continuation of PCT application No. PCT/EP2014/057583, entitled "METHOD FOR CONTROLLING A HYDRODYNAMIC RETARDER THAT CAN BE DISENGAGED BY A DISCONNECT CLUTCH", filed Apr. 15, 2014, which is incorporated herein by reference.

BACKGROUND OF THE INVENTION

1. Field of the Invention

The invention relates to a method for controlling a hydrodynamic retarder in a motor vehicle having a drive motor that can be disengaged via a disconnect clutch.

2. Description of the Related Art

It is known to equip motor vehicles with a hydrodynamic retarder that is also referred to as a hydrodynamic brake in order to generally be able to brake the motor vehicle wear free, in addition to braking with the so-called operating brake (friction brake) that is subject to wear. A hydrodynamic retarder of this type is known in various construction forms. They all have in common that at least two bladed wheels or rings together form a working chamber that can be filled with and drained of a working medium, in order to transfer torque via a hydrodynamic circulation flow of the working medium in the working chamber from the first bladed wheel to the second bladed wheel and to thereby decelerate the first bladed wheel.

It is known that hydrodynamic retarders still exert a certain braking effect upon the shaft, driving them or upon another component even in the so-called non-braking mode, in other words when no braking effect is to be created with them, since a circulatory flow of air is created in the working chamber that transfers an accordingly low residual braking torque between the blade wheels. Such a residual braking torque leads to increased fuel consumption of the drive motor of the motor vehicle since said motor operates against the residual braking torque.

In addition to constructive disadvantages and additional manufacturing and maintenance costs the integration of a disconnect clutch that engages during the transition from the non-braking mode to the braking-mode and disengages during the transition from the braking mode to the non-braking mode means that the build-up of a braking torque with the hydrodynamic retarder following a relevant request by the vehicle operator to turn on (initiation)—for example by operating a braking actuator or via a driver assist system can only occur when the disconnect clutch is engaged and a volume of working medium according to the requested braking torque has been introduced into the working chamber, whereby an appropriate amount of air has to be displaced from the working chamber which retards the introduction. In order to avoid that the disconnect clutch works already during synchronization against a braking torque that is provided by the retarder, engaging of the disconnect clutch and introduction of the working medium into the working chamber occurs consecutively with or without overlapping time periods, starting initially with engaging of the disconnect clutch. The necessary time period until the desired braking torque is available is an addition therefore, of the two consecutively provided time periods for engaging the disconnect clutch and for introduction of the working medium into the working chamber.

In order to be able to provide the braking torque requested by the vehicle operator or a driver assist system faster after initiating a braking procedure it has already been suggested in DE 10 2007 024 698 A1 to preventatively engage the disconnect clutch when the drive motor of a motor vehicle is in a so-called overrun operation even if no initiation of a braking procedure by the vehicle operator or via a driver assist system has occurred. If then, subsequently the vehicle operator or the driver assist system requests braking with the hydrodynamic retarder, in other words requests the transition from non-braking mode to braking mode then the working chamber of the hydrodynamic retarder merely needs to be filled with working medium. The delay between the initiation of the braking mode and the actual braking torque provided by the hydrodynamic retarder through engagement of the disconnect clutch is eliminated.

In practical applications it has been shown that the suggested solution results in a satisfactory response time of the hydrodynamic retarder; that however, the service life of the disconnect clutch is reduced.

It is therefore the objective of the current invention to improve the method described at the beginning in such a way that, when providing the braking torque with the hydrodynamic retarder without delay after initiation of the braking mode the service life of the clutch can be increased.

SUMMARY OF THE INVENTION

A first embodiment as concerns the current invention comprises a so-called rotor and a so-called stator, wherein the bladed wheel in the embodiment of the rotor rotates opposite a stator that is in the embodiment of a stationary bladed wheel or a stationary blade ring. A second embodiment according to the generic term provides that a rotating rotor and a counter-rotating rotor that rotates in opposite direction thereto together form the working chamber in order to transfer driving power from the rotor to the counter-rotor by means of the working medium.

It has therefore already been suggested to provide a disconnect clutch by means of which the hydrodynamic retarder can be disconnected in order to thereby remove the physical basis for any build-up of a circulatory flow in the working chamber. In the first mentioned generic embodiment of the hydrodynamic retarder, as can also be provided according to the current invention, the disconnect clutch is provided in the drive connection to the rotor so that said rotor can selectively be operated in the braking mode or to interrupt the drive in the non-braking mode. This means that, during the transition from the braking mode to the non-braking mode the disconnect clutch disengages and during the transition from the non-braking mode to the braking mode the disconnect clutch engages.

At the same time it is of course also necessary to fill the working chamber with working medium during the transition from the non-braking mode to the braking mode, and in order to avoid overloading of the disconnect clutch during synchronization to drain the working chamber of working medium during the transition from the breaking mode to the non-braking mode. The disconnect clutch can alternatively also be provided between the stator and a stationary support in order to arrest the stator by engaging the disconnect clutch during the transition from the non-braking mode to the braking mode, so that working medium that is fed into the working chamber accordingly creates a circulatory flow between the rotor and the stator and by means of disengaging the disconnect clutch during the transition from the braking mode to the non-braking mode to end the stationary support of the stator, so that the stator rotates freely with the rotor, due to which no circulatory flow can be created in the working chamber that is drained of medium. Lastly, a hydrodynamic retarder with a so-called counter-rotating rotor can also comprise a disconnect clutch in the drive connection to the counter-rotating rotor so that, with the engaged disconnect clutch in the braking mode it is driven in opposite direction to the rotor and with disengaged disconnect clutch in the non-braking mode rotates again freely with the rotor, so that also no circulatory flow can form in the working chamber due to the absence of a speed differential between rotor and counter-rotating rotor.

The current invention relates to all aforementioned embodiments of hydrodynamic retarders.

With the inventive method the number of engaging processes of the disconnect clutch can be considerably reduced, thus clearly increasing its service life. The disconnect clutch no longer engages in each overrun operation of the drive motor, but instead only under specific certain preconditions. The preconditions are thereby selected in such a way that an initiation of the braking mode by the vehicle operator or via a driver assist system in overrun operation as a rule occurs only when the disconnect clutch has already engaged. No noteworthy delay occurs therefore in the buildup of the braking torque compared to the known method.

In all alternatives of the inventive method for controlling a hydrodynamic retarder in a motor vehicle that can be disengaged via a disconnect clutch, the power output of the drive motor of the motor vehicle that serves to accelerate the drive wheels of the motor vehicle via a so-called drive train can be controlled. The power output is controlled or regulated according to the activation of an actuator by the vehicle operator or via a driver assist system. In a first operating state of the drive motor—the so-called traction operation the drive power of the drive motor is transmitted via the drive train of the motor vehicle to the drive wheels to accelerate the motor vehicle and in a second operating state—the so-called overrun operation the drive power is transmitted from the drive wheels into the drive train and in particular to the drive motor. Thus, in the second operating state the drive and in particular the drive motor, if it is not decoupled brakes the vehicle.

As indicated previously, the hydrodynamic retarder comprises either a driven bladed rotor and a bladed stator, or a driven bladed rotor and a bladed counter-rotating rotor driven in a direction opposite to the direction of the driven bladed rotor which together form a working chamber that can be filled with a working medium and drained of said working medium. Moreover, a disconnect clutch is provided by means of which the hydrodynamic retarder can selectively be disconnected from or connected to the drive train in order to initiate a hydrodynamic braking torque of the hydrodynamic retarder into the drive train in the braking mode and to avoid initiation of a braking torque in the non-braking operation.

As indicated, the disconnect clutch may be provided in the drive connection to the rotor and/or to the counter-rotating rotor in order to drive it accordingly in the engaged state of the disconnect clutch and to interrupt the driving power transfer in disengaged state of the disconnect clutch. Alternatively it is possible to provide the disconnect clutch between the stator and a stationary support, so that the stator in the braking mode—with engaged disconnect clutch—is connected for co-joint rotation to the stationary support and the stator can rotate freely with the rotor in the non-braking mode. Also in the case of a counter-rotating rotor that is equipped with a disconnect clutch, it can rotate freely with the rotor in the non-braking mode in one embodiment of the invention, whereas in the braking mode with engaged disconnect clutch it is driven in opposite direction to the rotor. In this embodiment the rotor is always driven in contrast to an alternative inventive embodiment wherein rotor and counter-rotating rotor can be disconnected together via disconnect clutch.

According to a first variation of the inventive method the acceleration of the motor vehicle in the overrun operation is now collected or detected and compared with a previous acceleration limit. The acceleration limit can be a constant value or can be variably predefined depending on boundary conditions. According to the invention, that is also in overrun operation, the disconnect clutch is engaged in the non-braking mode, independent from an initiation of the braking mode by the vehicle operator or the driver assist system and the working chamber is kept drained of working medium if the acceleration is above the acceleration limit. In particular, on the other hand the disconnect clutch is also kept disengaged in overrun operation as long as no initiation of the braking mode by the vehicle operator or via the driver assist system occurs.

According to an alternative embodiment of the inventive method the topography of the route that is taken by the vehicle is collected or detected in the overrun mode, and thereby—that is also in overrun operation—in the non-braking mode the disconnect clutch is engaged depending on the topography, regardless of an initiation of the braking mode by the vehicle operator or the driver assist system.

For example, a gradient of a route section that has just been covered and/or a route section that will directly or indirectly be traveled by the motor vehicle can be determined from the topography and the determined gradient can be compared with a pre-specified gradient limit value, whereby in the non-braking mode the disconnect clutch is being engaged, regardless of an initiation of the braking mode by the vehicle operator or the driver assist system, if the gradient is greater than the gradient limit value. Regarding the specification of a limit value for the gradient the previous stipulations in regard to the specification of the acceleration limit values apply. In one inventive embodiment the disconnect clutch that is engaged in the overrun operation is again disengaged at the beginning of the following traction operation since it can be assumed that the initiation of the braking mode in the subsequent time period by the vehicle operator or via the driver assist system is unlikely. In addition or alternatively it may be provided that as soon as a specified boundary condition occurs the disconnect clutch is disengaged again already in the same overrun operating condition in which the disconnect clutch in the non-braking mode was previously engaged.

The boundary condition may for example be that the collected or detected acceleration of the motor vehicle is below the acceleration limit, in particular by a predefined amount below the acceleration limit—the latter in order to develop a hysteresis. When considering the topography during engagement of the disconnect clutch, the topography can in the same overrun operation also again be provided as the triggering event for disengaging of the disconnect clutch; in other words the disconnect clutch can again be disengaged subject to the topography. If a gradient is determined from the topography the engaged disconnect clutch can for example again be disengaged in the same overrun operation in the same way as the engagement occurred as soon as the gradient is below the gradient limit, in particular below the gradient limit by the predefined amount.

The inventive preventive engagement of the disconnect clutch in overrun operation in the non-braking mode can additionally occur dependent upon additional input values, for example load conditions or respectively total weight of the motor vehicle—the latter in particular when considering the gradient. For example in the case of a comparatively heavier loaded motor vehicle, engagement of the disconnect clutch can occur already at a lower limit than with a comparatively lighter motor vehicle. An additional example for an input value is the vehicle speed. The limit can for example be specified variably subject to the actual vehicle speed, and can be selected in particular lower at a higher speed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
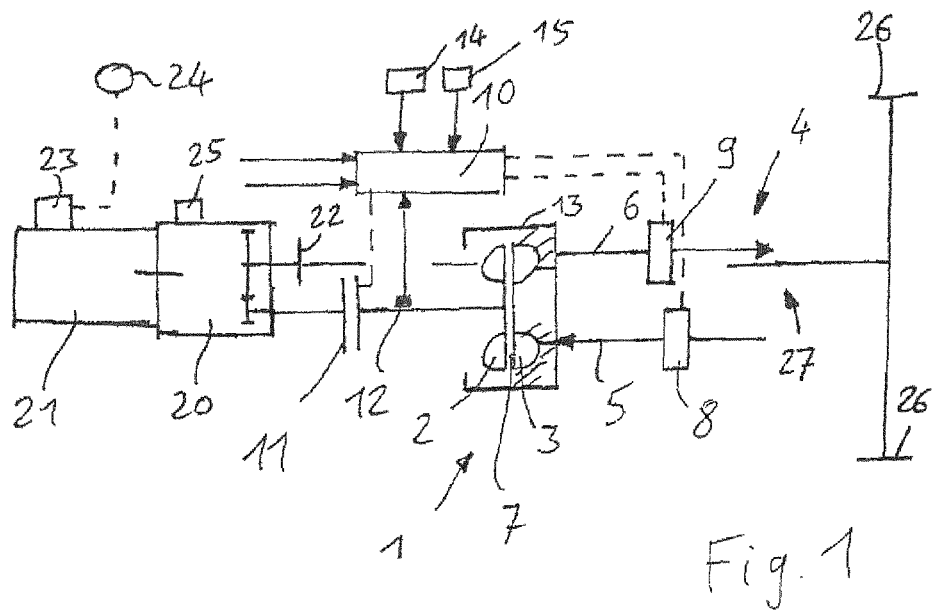
FIG. 1 illustrates a motor vehicle drive train in a first embodiment, wherein the inventive method can be applied.

FIG. 1 illustrates a hydrodynamic retarder 1 with a rotor 2 and a stator 3. The working medium is fed via a working medium feed line 5 from an external working medium circuit 4 into working chamber 7; and for cooling of the working medium that was heated in working chamber 7 is removed from retarder 1 via working medium outlet 6. An inlet valve 8 is arranged in working medium feed line 5 and a retarder outlet valve 9 is provided in working medium outlet line 6. Retarder controller 10 accesses retarder inlet valve 8 as well as also retarder outlet valve 9, at least indirectly.

Retarder inlet valve 8 is disengaged for the transition from the non-braking mode to the braking mode. Retarder outlet valve 9 is activated by a signal pressure in such a way that it causes the desired accumulation of working medium and thus the desired fill level in working chamber 7. Alternatively, a filling level control by means of a pressure application that displaces a working medium supply could also be considered.

When transitioning from braking mode to non-braking mode inlet valve 8 is closed, so that no additional working medium can flow into working chamber 7. At the same time outlet valve 9 is kept open until working chamber 7 has drained to the desired level. For this it is necessary to continue to drive rotor 2 in order to utilize its pumping effect. Consequently, disconnect clutch 11 is kept engaged until it is ensured that draining to a sufficient level has occurred.

Since the duration of draining is dependent upon the rotational speed of rotor 2 at the time of the desired shut-down, in other words when detecting a request to turn off the retarder, the rotational speed of rotor 2 is detected, for example by illustrated speed sensor 12 and is communicated to retarder controller 10. Speed sensor 12 could also be located at a different position, for example in the direction of the of the driving power flow before disconnect clutch 11; or the rotational speed could be provided differently to retarder controller 10, for example via CAN-bus since the rotational speed generally depends on another rotational speed in the drive train in which hydrodynamic retarder 1 is provided, for example the rotational speed of the transmission output shaft of a motor vehicle transmission or the vehicle speed in the case of a so-called secondary retarder or the motor speed in the case of a primary retarder.

Retarder controller 10 further controls disengaging and engaging of disconnect clutch 11, as indicated by the broken line. It moreover receives input signals, for example from a retarder operating lever and a driver assist system, in order to be able to detect a request to turn on the retarder or a request to turn off the retarder.

Retarder 1 in the illustrated example is arranged on the secondary side on an additional output train of a transmission 20 of the motor vehicle, whereby in the illustrated example disconnect clutch 11 and retarder 1 are provided outside of transmission 20 or respectively on the outside of transmission 20. Alternatively, disconnect clutch 11 and/or retarder 1 can also be integrated in transmission 20.

Transmission 20 transfers drive power of drive motor 21 via a transmission output flange 22 to drive wheels 26 of the motor vehicle. Drive motor 21 comprises a motor controller 23 that controls the power output of the drive motor according to the activation of an actuator 24, for example a foot pedal or lever that is not illustrated in detail. Transmission 20 also comprises a transmission controller 25 that controls switching operations in transmission 20, either automatically or according to the activation of an actuator by the vehicle operator.

Retarder controller 10 can receive the vehicle speed as an additional input signal which is supplied for example via a non-illustrated CAN-bus 14. It is moreover possible that signals of a navigation system, in particular a GPS system 15 are provided to retarder controller 10, so that said controller can process the topography or gradient of the route that is currently being traveled by the vehicle.

According to the invention and under the precondition that drive motor 21 is operated in the so-called overrun operation, in other words, if drive output is directed from drive wheels 26 into drive train 27 via which drive wheels 26 are connected with drive motor 21 (by interconnecting transmission 20), disconnect clutch 11 is preventatively engaged if the vehicle acceleration that is calculated or directly detected is above a specified acceleration limit. In addition or alternatively the topography or gradient of the route that is being driven can also be utilized in the decision as to whether disconnect clutch 11 is preventatively engaged.

Figure 2:
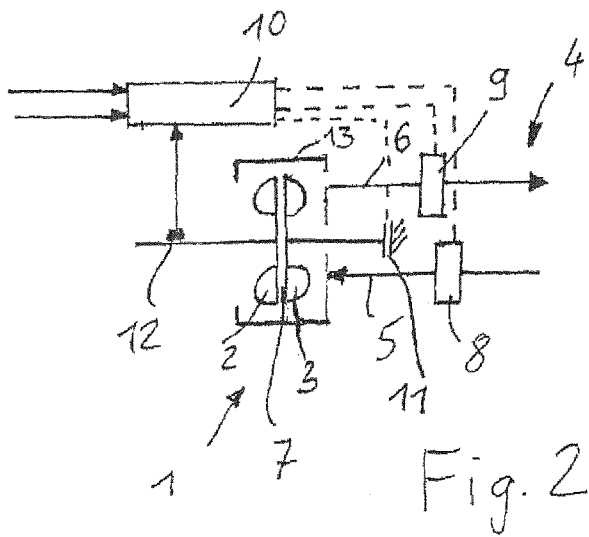
FIG. 2 illustrates a motor vehicle drive train in a second embodiment, wherein the inventive method can be applied.

The embodiment according to FIG. 2 is extensively that of FIG. 1. Details of the drive train of the motor vehicle have been omitted in this case. In contrast to the embodiment in FIG. 1, disconnect clutch 11 is provided in the drive connection with stator 3, so that stator 3 in the non-braking mode of hydrodynamic retarder 1 rotates with rotor 2 without a braking torque being created and during the transition from the non-braking mode to the braking mode, braking to a standstill occurs through disconnect clutch 11.

Alternatively, a counter-rotating rotor could be provided in place of stator 3 that is accelerated during the transition from the non-braking mode to the braking-mode by means of disconnect clutch 11 and that is driven in the opposite direction of rotation of rotor 2.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a hydrodynamic retarder in a motor vehicle that can be mechanically disengaged via a disconnect clutch, comprising a drive motor whose power output is controlled via an actuator such as a foot pedal or a lever;
   wherein subject to activation of the actuator, the drive motor is driven in a first operating state known as a traction operation wherein drive power of the drive motor is transmitted via a drive train of the motor vehicle to drive wheels to accelerate the motor vehicle and, in a second operating state known as an overrun operation, the drive power is transmitted from the drive wheels into the drive train;
   wherein the hydrodynamic retarder includes a driven bladed rotor and one of a bladed stator and a bladed counter-rotating rotor driven in a direction opposite to the direction of the bladed rotor, that together form a working chamber that can be filled with a working medium and drained of the working medium;
   wherein the driven bladed rotor is operable to be selectively disconnected by way of the disconnect clutch from the drive train and is operable to be connected with same for co-joint rotation;
   wherein in a braking mode initiated by an operator of the motor vehicle or by a driver assist system the bladed rotor is driven opposite the stationary bladed stator or in the opposite direction from the bladed counter-rotating rotor and with the working chamber filled, torque from the driven bladed rotor is transferred to the bladed stator or to the counter-rotating rotor;
   wherein in a non-braking mode initiated by an operator of the motor vehicle or by the driver assist system with the disconnect clutch disengaged the transfer of driving power to at least one of the driven bladed rotor and the bladed counter-rotating rotor is interrupted and the working chamber is drained of the working medium;
   wherein during the transition from the non-braking mode to the braking mode the disconnect clutch is engaged and the working chamber is filled with the working medium; and
   wherein during the transition from the braking mode to the non-braking mode the working chamber is drained of the working medium and the disconnect clutch is disengaged simultaneously or time-delayed;
   in the overrun operation the acceleration of the motor vehicle is collected or detected and compared with a pre-specified acceleration limit; and
   in the non-braking mode when the acceleration exceeds said acceleration limit the disconnect clutch is engaged, regardless of an initiation of the braking mode by the operator of the motor vehicle or the driver assist system and the working chamber is maintained drained.

2. The method of claim 1, wherein that in the overrun operation in the non-braking mode, the engaged disconnect clutch is only subsequently opened at a start of the next traction operation.

3. The method of claim 1, wherein the disconnect clutch that is engaged during the overrun operation in the non-braking mode is subsequently disengaged during the overrun operation as soon as the collected or detected acceleration is below a pre-specified amount of the acceleration limit.

4. The method of claim 3, wherein the disconnect clutch that is engaged during the overrun operation in the non-braking mode is also disengaged again at a start of the next traction operation.

5. A method for controlling a hydrodynamic retarder in a motor vehicle that can be mechanically disengaged via a disconnect clutch, comprising a drive motor whose power output is controlled via an actuator such as a foot pedal or a lever;
   wherein the drive motor is driven in a first operating state known as a traction operation wherein drive power of the drive motor is transmitted via a drive train of the motor vehicle to drive wheels to accelerate the motor vehicle and, in a second operating state known as an overrun operation, the drive power is transmitted from the drive wheels into the drive train;
   wherein the hydrodynamic retarder includes a driven bladed rotor and one of a bladed stator and a bladed counter-rotating rotor driven in a direction opposite to the direction of the bladed rotor, that together form a working chamber that can be filled with a working medium and drained of the working medium;
   wherein the bladed stator is operable to be selectively disconnected by way of the disconnect clutch in respect to a stationary support and is operable to be connected with same for co-joint rotation, or the bladed counter-rotating rotor is operable to be selectively disconnected by way of the disconnect clutch from the drive train and is operable to be connected with same for co-joint rotation;
   wherein in a braking mode initiated by an operator of the motor vehicle or by a driver assist system, the bladed rotor is driven with the disconnect clutch engaged opposite the stationary bladed stator or via the bladed counter-rotating rotor that is driven in the opposite direction of the bladed rotor, and with a filled working chamber the torque from the bladed rotor is transferred to the bladed stator or the bladed counter-rotating rotor;
   wherein with the disconnect clutch disengaged in a non-braking mode by an operator of the motor vehicle or by a driver assist system, the coupling of the bladed stator opposite a stationary support or the drive power transfer from the drive train to the bladed counter-rotating rotor is interrupted;
   wherein during the transition from the non-braking mode to the braking mode the disconnect clutch is engaged and the working chamber is filled with the working medium; and
   wherein during the transition from the braking mode to the non-braking mode the working chamber is drained of the working medium and the disconnect clutch is disengaged simultaneously or time-delayed;
   in the overrun operation the acceleration of the motor vehicle is collected or detected and compared with a pre-specified acceleration limit; and in the non-braking mode when the acceleration exceeds said acceleration limit the disconnect clutch is engaged, regardless of an initiation of the braking mode by the operator of the motor vehicle or the driver assist system and the working chamber is maintained drained.

6. The method of claim 5, wherein that in the overrun operation in the non-braking mode, the engaged disconnect clutch is only subsequently opened at a start of the next traction operation.

7. The method of claim 5, wherein the disconnect clutch that is engaged during the overrun operation in the non-braking mode is subsequently disengaged during the overrun operation as soon as the collected or detected acceleration is below a pre-specified amount of the acceleration limit.

8. The method of claim 7, wherein the disconnect clutch that is engaged during the overrun operation in the non-braking mode is also disengaged again at a start of the next traction operation.

9. A method for controlling a hydrodynamic retarder in a motor vehicle that can be mechanically disengaged via a disconnect clutch, comprising a drive motor whose power output is controlled via an actuator such as a foot pedal or a lever;
wherein the drive motor is driven in a first operating state known as a traction operation wherein drive power of the drive motor is transmitted via a drive train of the motor vehicle to drive wheels to accelerate the motor vehicle and, in a second operating state known as an overrun operation, the drive power is transmitted from the drive wheels into the drive train;
wherein the hydrodynamic retarder includes a driven bladed rotor and one of a bladed stator and a bladed counter-rotating rotor driven in a direction opposite to the direction of the bladed rotor, that together form a working chamber that can be filled with a working medium and drained of the working medium;
wherein the driven bladed rotor is operable to be selectively disconnected by way of the disconnect clutch from the drive train and is operable to be connected with same for co-joint rotation;
wherein in a braking mode initiated by an operator of the motor vehicle or by a driver assist system the bladed rotor is driven opposite the stationary bladed stator or in the opposite direction from the bladed counter-rotating rotor and with the working chamber filled, torque from the driven bladed rotor is transferred to the bladed stator or to the counter-rotating rotor;
wherein in a non-braking mode initiated by an operator of the motor vehicle or by the driver assist system with the disconnect clutch disengaged the transfer of driving power to at least one of the driven bladed rotor and the bladed counter-rotating rotor is interrupted and the working chamber is drained of the working medium;
wherein during the transition from the non-braking mode to the braking mode the disconnect clutch is engaged and the working chamber is filled with the working medium; and
wherein during the transition from the braking mode to the non-braking mode the working chamber is drained of the working medium and the disconnect clutch is disengaged simultaneously or time-delayed;
in the overrun operation a topography of a just-traveled route that has just been covered by the motor vehicle is collected or detected; and
in the non-braking mode the disconnect clutch is engaged depending on the topography, regardless of an initiation of the braking mode by the vehicle operator or the driver assist system.

10. The method of claim 9, wherein that in the overrun operation in the non-braking mode, the engaged disconnect clutch is only subsequently opened at a start of the next traction operation.

11. The method of claim 9, wherein the disconnect clutch that is engaged during the overrun operation in the non-braking mode is subsequently disengaged again depending on the topography.

12. The method of claim 11, wherein the disconnect clutch that is engaged during the overrun operation in the non-braking mode is also disengaged again at a start of the next traction operation.

13. The method of claim 12, wherein at least one of a gradient of the just-traveled route section and a gradient of a route section following the just-traveled route section directly or indirectly is determined from the topography, and the gradient is compared with a pre-specified gradient limit, and the disconnect clutch is engaged in the non-braking mode if the gradient is greater than the pre-specified gradient limit.

14. The method of claim 13, wherein the disconnect clutch that is engaged during the overrun operation in the non-braking mode is again disengaged as soon as the gradient is less than a pre-specified amount below the pre-specified gradient limit.

15. A method for controlling a hydrodynamic retarder in a motor vehicle that can be mechanically disengaged via a disconnect clutch, comprising a drive motor whose power output is controlled via an actuator such as a foot pedal or a lever;
wherein the drive motor is driven in a first operating state known as a traction operation wherein drive power of the drive motor is transmitted via a drive train of the motor vehicle to drive wheels to accelerate the motor vehicle and, in a second operating state known as an overrun operation, the drive power is transmitted from the drive wheels into the drive train;
wherein the hydrodynamic retarder includes a driven bladed rotor and one of a bladed stator and a bladed counter-rotating rotor driven in a direction opposite to the direction of the bladed rotor, that together form a working chamber that can be filled with a working medium and drained of the working medium;
wherein the bladed stator is operable to be selectively disconnected by way of the disconnect clutch in respect to a stationary support and is operable to be connected with same for co-joint rotation, or the bladed counter-rotating rotor is operable to be selectively disconnected by way of the disconnect clutch from the drive train and is operable to be connected with same for co-joint rotation;
wherein in a braking mode initiated by an operator of the motor vehicle or by a driver assist system, the bladed rotor is driven with the disconnect clutch engaged opposite the stationary bladed stator or via the bladed counter-rotating rotor that is driven in the opposite direction of the bladed rotor, and with a filled working chamber the torque from the bladed rotor is transferred to the bladed stator or the bladed counter-rotating rotor;
wherein with the disconnect clutch disengaged in a non-braking mode by an operator of the motor vehicle or by a driver assist system, the coupling of the bladed stator opposite a stationary support or the drive power transfer from the drive train to the bladed counter-rotating rotor is interrupted;

wherein during the transition from the non-braking mode to the braking mode the disconnect clutch is engaged and the working chamber is filled with the working medium; and wherein during the transition from the braking mode to the non-braking mode the working chamber is drained of the working medium and the disconnect clutch is disengaged simultaneously or time-delayed;

in the overrun operation a topography of a just-traveled route that has just been covered by the motor vehicle is collected or detected; and in the non-braking mode the disconnect clutch is engaged depending on the topography, regardless of an initiation of the braking mode by the vehicle operator or the driver assist system.

16. The method of claim 15, wherein that in the overrun operation in the non-braking mode, the engaged disconnect clutch is only subsequently opened at a start of the next traction operation.

17. The method of claim 15, wherein the disconnect clutch that is engaged during the overrun operation in the non-braking mode is subsequently disengaged again depending on the topography.

18. The method of claim 17, wherein the disconnect clutch that is engaged during the overrun operation in the non-braking mode is also disengaged again at a start of the next traction operation.

19. The method of claim 18, wherein at least one of a gradient of the just-traveled route section and a gradient of a route section following the just-traveled route section directly or indirectly is determined from the topography, and the gradient is compared with a pre-specified gradient limit, and the disconnect clutch is engaged in the non-braking mode if the gradient is greater than the pre-specified gradient limit.

20. The method of claim 19, wherein the disconnect clutch that is engaged during the overrun operation in the non-braking mode is again disengaged as soon as the gradient is less than a pre-specified amount below the pre-specified gradient limit.

* * * * *